ized ARE PATENT OFFICE.

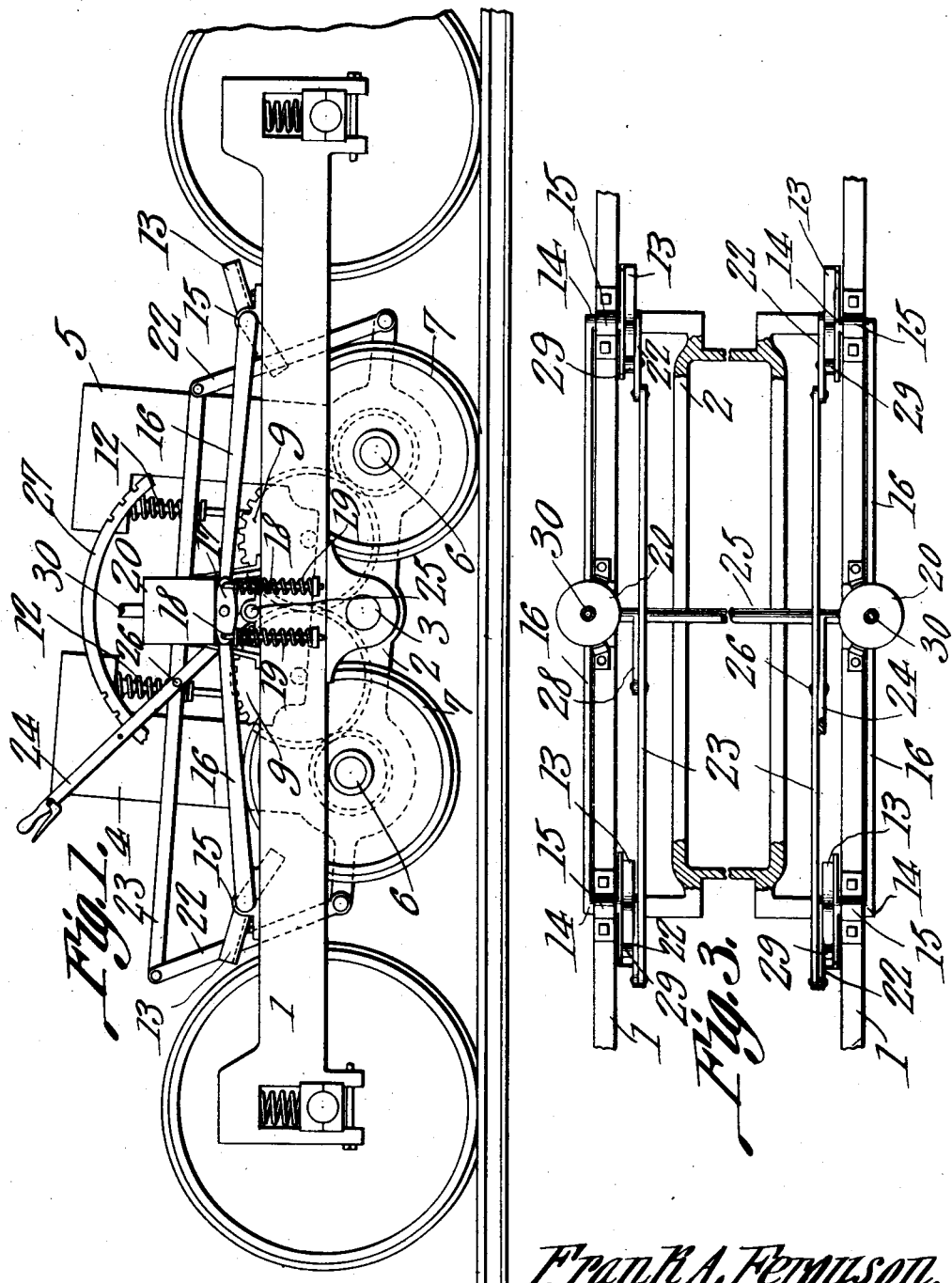

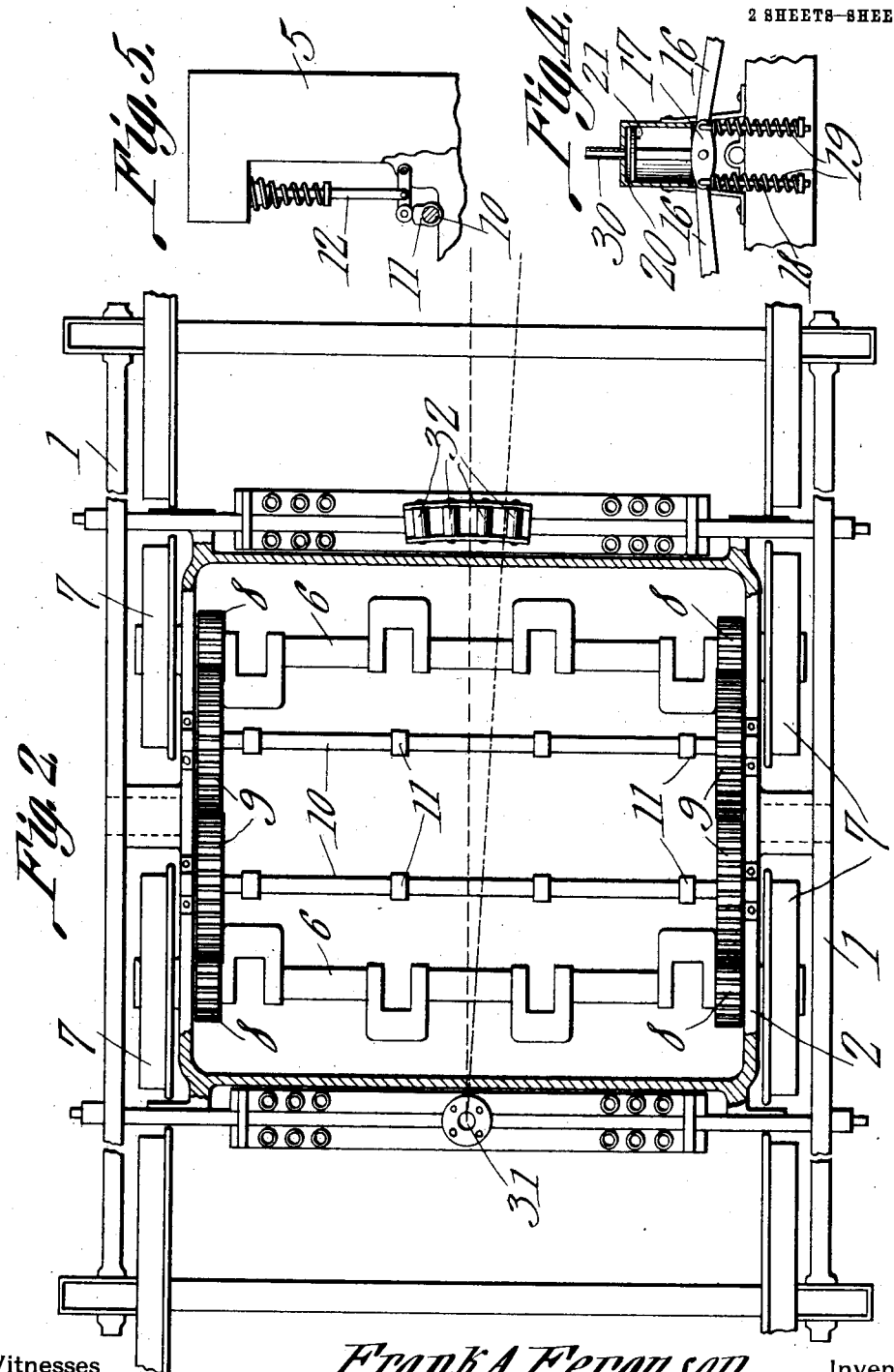

UNITED STATES PATENT OFFICE.

FRANK A. FERGUSON, OF BELLEVILLE, KANSAS.

DRIVE-GEAR FOR MOTOR-CARS.

998,764.

Specification of Letters Patent.  Patented July 25, 1911.

Application filed June 1, 1910. Serial No. 564,375.

*To all whom it may concern:*

Be it known that I, FRANK A. FERGUSON, a citizen of the United States, residing at Belleville, in the county of Republic and State of Kansas, have invented a new and useful Drive-Gear for Motor-Cars, of which the following is a specification.

This invention relates to drive mechanism for motor cars, and its principal object is to provide a power plant which is movably mounted upon the truck of a car and which is tiltable to apply either of two sets of fly wheels to the rails on which the car is mounted so as to propel the car either in a forward or backward direction.

A further object is to provide drive mechanism by means of which different speeds of the car may be obtained without the necessity of utilizing variable speed gearing such as commonly employed upon motor vehicles of different types.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a side elevation of a car truck having the present improvements applied thereto. Fig. 2 is a plan view of the truck, the engines and the operating mechanism of the power plant being removed and the engine bed being shown partly in section. Fig. 3 is a plan view of the tilting mechanism, the middle portion of the power plant being removed. Fig. 4 is an enlarged section through one of the cylinders of the air operated mechanism, the adjacent parts being shown in elevation. Fig. 5 is a side elevation of a portion of one of the engines and showing the cam shaft in section and the valve mechanism operated thereby.

Referring to the figures by characters of reference 1 designates the frame of a single truck, or of the forward section of a bogie truck, and an engine bed 2 is hung within this truck, it being provided with laterally extending trunnions located at the centers of the sides thereof and journaled within the sides of the truck 1. Preferably two multiple cylinder explosive engines 4 and 5 are mounted on the base 2 so as to counter-balance each other, the engine 4 being adapted to run clockwise while the engine 5 runs counter-clockwise.

The crank shaft 6 of each engine extends transversely of the base 2 and projects beyond the sides thereof, there being a fly wheel 7 upon each end of the shaft 6 and normally located above but out of contact with the rails on which the wheels of the truck 1 are mounted. Each of the fly wheels 7 is preferably formed with a flange as shown particularly in Fig. 2. Gears 8 are secured to the shaft 6 and mesh with larger gears 9 formed on parallel transversely extending cam shafts 10 such as ordinarily employed in some types of multiple cylinder engines.

The cams on the shafts have been indicated at 11 and are adapted to operate in proper succession the valve mechanisms of a multiple cylinder motor. The mechanism of one cylinder has been shown generally at 12 in Figs. 1 and 5. Similar angular guide rails 13 are tiltably mounted upon the sides of the truck 1 above the front and rear portions of the base 2, each of these tiltable rails being provided with a central trunnion 14 mounted to rotate within a bearing 15 provided therefor on the truck 1. The two rails 13 are oppositely disposed, as clearly shown in Fig. 1 and the trunnions 14 thereof have converging arms 16 fixedly connected thereto and pivotally secured at their upper ends to an equalizing link 17. The end portions of this link are connected to guide rods 18 slidably mounted on the truck 1 and yieldingly supported by springs 19 which also serve to maintain the link 17 at a desired elevation. It is to be understood of course that a set of arms 16 and rails 13 is located at each side of the truck and that each set is provided with an equalizing link 17. A cylinder 20 is mounted on each side of the truck and above the equalizing link 17 and has a piston 21 mounted to reciprocate therein and connected to the link 17 thereunder.

Upwardly extending links 22 are pivotally connected to the front and rear ends of the base 2 and the upper ends of the links at each side of the truck are connected by a rod or bar 23. An operating lever 24 extends upwardly from one end of a transversely arranged shaft 25 and is pivotally connected to the middle portion of bar or rod 23, as shown at 26. This lever is provided with a pawl or dog, not shown, and which is adapted to engage a quadrant 27 whereby the said lever can be locked in any desired position relative to the horizontal. An arm 28 extends upwardly from that end of shaft 25 farthest removed from the lever 24 and is pivotally connected to the middle portion of the bar or rod 23 adjacent thereto. Each of the links 22 has a roller or projection 29 extending laterally therefrom and adapted to ride upon the adjoining tiltable rail 13.

It is to be understood that when the lever 24 is in a vertical position, the links 22 are also vertically disposed and the projections 29 thereon are mounted on the intermediate or apex portions of the tiltable rails 13. The base 2 is thus supported in a substantially horizontal position.

To propel the car, the engines 4 and 5 are set in motion and the fly wheels 7 will be rotated at the high speed, the two shafts 6 rotating in opposite directions. The lever 24 is then swung upon its fulcrum so as to move the links 22 in the desired direction. The projections 29 upon one set of links will travel downwardly on the rails 13 adjacent thereto, while the corresponding projections on the other links will travel upwardly on the adjoining rails 13. The base 2 will thus be tilted, the fly wheels on one of the shafts 6 being brought close to but out of contact with the rails thereunder. This position of the mechanism has been shown in Fig. 1. After the parts have thus been set air, under pressure, may be admitted to the cylinders 20 through the inlets 30 and will force the pistons 21 downwardly, thus correspondingly shifting the equalizing link 17. This link will force the adjoining ends of the two arms 16 downwardly and all of the rails 13 will thus be simultaneously tilted to a greater extent, the elevated ends of the rails at one end of the truck pulling upwardly on the elevated end of the base 2 through links 22 and projections 29, thereby forcing the opposite or lower end of said base to move downwardly. The lowered fly wheels will thus be brought into frictional engagement with the rails and will slip thereon until the car has attained the speed of the wheels 7. Obviously the time occupied in attaining the highest speed of the car can be regulated by the air directed against the pistons 21. Obviously the load applied to the wheels 7 can thus be varied from nothing to nearly the entire weight of the truck and the front half of the car body. To reverse the movement of the car, it is merely necessary to swing the lever 24 to its opposite position on the quadrant 27, whereupon the base 2 will be tilted in the opposite direction. Inasmuch as the points of support of the engine base in the truck are slightly higher than the centers of the driving wheels 7, it will be apparent that the forward push of the engine helps to apply pressure to its own driving wheels.

It is designed to pivot the car body just forward of the front engine, as indicated at 31 and to mount the said body upon a set of antifriction rollers located directly back of the rear engine. These rollers have been shown at 32. By mounting the car body in this manner it will be seen that, in rounding a curve, the rear support of the car body is brought outside of a center line of the car, making the center of gravity fall inside of the center line of the truck, this, obviously, helping to overcome the centrifugal force which is always apparent when rounding a curve.

It will be apparent of course that various changes may be made in the construction and arrangement of the parts without departing from the spirit or sacrificing any of the advantages of the invention as defined in the appended claims.

What is claimed is:—

1. A car structure having a tiltable power plant thereon including fly wheels, and means for tilting the plant to bring either of the wheels into contact with the surface on which the wheels of the truck are mounted.

2. The combination with a car structure, of a power plant mounted upon the truck and including drive wheels, and means for tilting said plant relative to the truck to apply either drive wheel to the supporting surface on which the structure is mounted.

3. The combination with a car structure, of a power plant movably mounted upon the truck, said plant including drive wheels, means for shifting said plant relative to the truck to set either of two drive wheels in a predetermined position, and means for shifting the set wheel to frictionally engage the surface on which the truck is mounted to travel.

4. The combination with a car structure, of a power plant movably mounted relative to the truck and carried thereby, said plant including drive wheels mounted to simultaneously rotate in opposite directions, means for shifting the said plant to set one of the wheels adjacent the supporting surface on which the truck is mounted to travel, and means for moving the set wheel into frictional engagement with said surface.

5. The combination with a car structure, of a power plant carried thereby and movable relative thereto, said plant including drive wheels and means for simultaneously rotating the wheels in opposite directions, means for setting either of the wheels adjacent the surface on which the truck is mounted to travel, and pressure operated means for moving the set wheel into frictional engagement with said surface.

6. The combination with a car truck, of a power plant tiltably mounted thereon and including drive wheels, and means for simultaneously rotating the wheels in opposite directions, means for tilting the said plant to position one of the wheels adjacent the surface on which the truck is mounted to travel and pressure operated means for placing the shifted wheel in frictional engagement with said surface.

7. The combination with a car truck, of a power plant tiltably mounted thereon and including drive wheels and means for simultaneously rotating the wheels in opposite directions, manually operated means for tilting said plant to lower one of said wheels, and pressure operated means for placing the lowered wheel in frictional engagement with the surface on which the truck is mounted to travel.

8. The combination with a car structure, of a power plant tiltably mounted thereon and including drive wheels, and means for simultaneously rotating the wheels in opposite directions, means for tilting the plant to lower one of said wheels, and pressure operated means for placing the lowered drive wheel in frictional engagement with the surface on which the truck is mounted to travel, the center of the lowered wheel being below the pivot of the power plant.

9. The combination with a car truck, of a base tiltably mounted thereon, oppositely disposed counter-balanced motors upon the base, a shaft driven by each motor and carried by the base, combined fly wheels and drive wheels upon each shaft, the two shafts rotating in opposite directions, cam shafts interposed between said first mentioned shafts, means for transmitting motion between the engines through the cam shafts, and means for tilting the base to apply the wheels on either engine shaft to the surface on which the truck is mounted to travel.

10. The combination with a truck, of a power plant movably mounted thereon and including a tiltable base, counter-balance motors carried thereby, a drive shaft operated by each motor, cam shafts interposed between the drive shafts, gears upon the cam and drive shafts for transmitting motion from one motor to the other, drive wheels upon the drive shafts, the wheels on each shaft being revoluble in a direction opposite to the wheels on the opposed drive shafts, means for tilting the base to lower the wheels of one of said shafts, and pressure operated means for placing the lowered wheels in frictional engagement with the surface on which the truck is mounted to travel.

11. The combination with a truck, of a power plant movably mounted thereon having a tiltable base, drive shafts journaled on the base, a motor for actuating each shaft, means for transmitting motion between the two motors, the said shafts being simultaneously revoluble in opposite directions, drive wheels carried by and revoluble with the shafts, manually operated means for tilting the base to lower the wheels of either shaft, and pressure operated means for placing the lowered wheels in frictional engagement with the surface on which the truck is mounted to travel.

12. The combination with a truck, of tiltable guide rails thereon, said rails being oppositely disposed, pressure operated means for simultaneously tilting the said rails in opposite directions, a tiltable power plant carried by the truck, members connected to opposite ends of said plant and adapted to travel upon the tiltable rails, and means for actuating said members to tilt the plant.

13. The combination with a truck, of a centrally mounted tiltable power plant thereon and including separate motors, drive wheels operated by each motor, means for lowering the wheels of either motor and raising the wheels of the other motor, and pressure operated means for placing the lowered wheels in frictional engagement with the surface on which the truck is mounted to travel.

In testimony that I claim the foregoing as my own, I have hereto affixed my signature in the presence of two witnesses.

FRANK A. FERGUSON.

Witnesses:
MONT S. HILL,
W. H. BELL.

Copies of this patent may be obtained for five cents each, by addressing the "Commissioner of Patents, Washington, D. C."